Aug. 16, 1927.

A. A. D. LANG 1,639,570

VEHICLE WHEEL

Filed Nov. 29, 1924

Inventor
Arthur A. D. Lang

By James L. Norris
Attorney

Patented Aug. 16, 1927.

1,639,570

UNITED STATES PATENT OFFICE.

ARTHUR ALEXANDER DASHWOOD LANG, OF LONDON, ENGLAND.

VEHICLE WHEEL.

Application filed November 29, 1924. Serial No. 752,971, and in Great Britain November 30, 1923.

This invention relates to vehicle wheels and more particularly to disc wheels of either flat or dished configuration, and has for its object to provide an improved construction whereby a strong, light and resilient wheel may be produced readily and inexpensively. A further object of the invention is to provide a wheel which may be readily balanced.

According to the present invention the wheel or, if it is fitted with a rim, felloe or hub, the body portion of the wheel is constituted solely, or in conjunction with wooden spacing members, of layers or laminæ of wood in disc form cemented together side by side with their planes substantially at right angles to the axis of the wheel. The several laminæ are so orientated or disposed relatively to each other that the directions of the grain are displaced angularly so as to ensure substantially equal resistance to stress on all diameters. In any case, whether the wheel body is provided with wood spacing rings or consists entirely of laminar discs cemented together, all stresses between the wheel axle and tread, whether due to load or driving or running, are transmitted entirely through the built up wooden body.

If it be desired to produce a wheel of dished configuration this may be done by turning down a flat wheel constructed as above set forth or by gluing together a series of laminæ as above set forth, and shaping the wheel in a press between dies of suitable shape. In the latter event it is desirable that each lamination be constituted by a series of sectors which are preferably so arranged that the grain of the wood is parallel with the chord, whilst the sectors of the superimposed laminæ are so arranged that the joints between sectors of one lamination are in staggered relationship with those of the adjacent lamina or laminæ.

Metal rims may be attached to wheels constructed in any of the aforementioned ways, by any usual method, for instance, as is employed in connection with so-called "artillery" motor car wheels, or they may be bolted to the sides of the felloes. The wheels may be furnished with hubs after the manner of aeroplane propellers or may be built so as to be capable of substitution for one or other of the well-known detachable type of wheels.

The invention will be described with reference to the accompanying drawings, in which—

Figure 1:
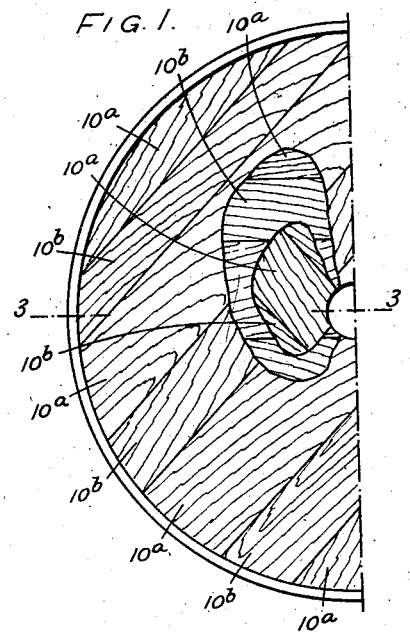
Figure 2:
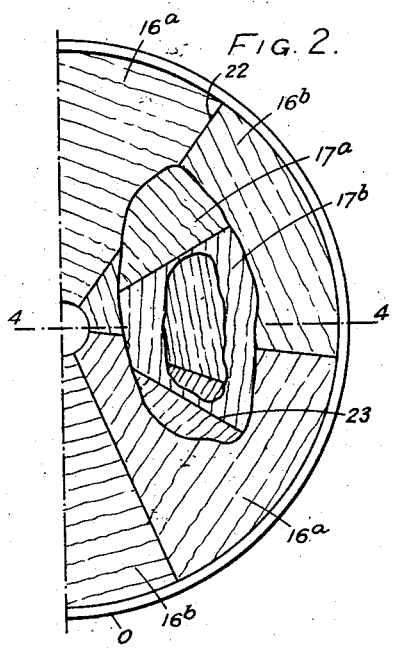
Figure 3:
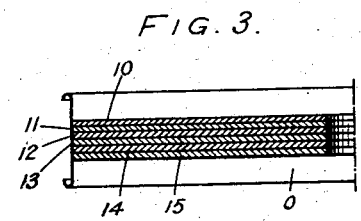
Figure 4:
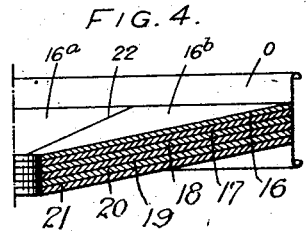
Figure 5:
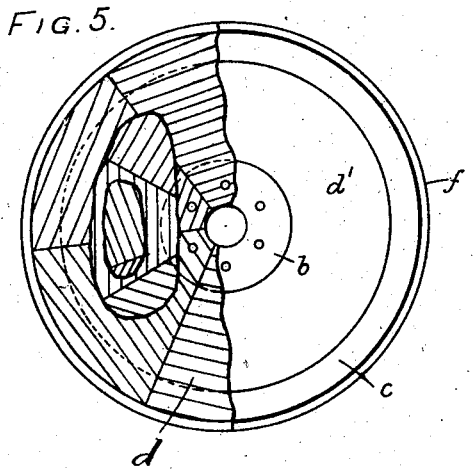

Figs. 1 and 2 are elevations showing two embodiments of the invention, parts being shown broken away, whilst Figs. 3 and 4 are sections taken on the lines 3—3 and 4—4 of Figs. 1 and 2, respectively. Fig. 5 is an elevation with part broken away showing a modification, and Fig. 6 a central vertical section of same.

As shown in Figs. 1 and 3, a wheel is formed from a series of disc-shaped laminæ 10, 11 . . . 15, the directions of grains of which are angularly displaced with respect to each other to ensure substantially equal resistance to stress on all diameters. The angular displacement between contiguous laminæ has preferably the value $\frac{180°}{N}$, where N is the number of laminæ. The laminæ or discs are superimposed and firmly cemented together as by gluing under pressure. As shown, each of the laminæ may consist of a series of strips of equal or unequal width, such as $10^a$, $10^b$, laid edge to edge so that the directions of their grains are substantially parallel.

Figs. 2 and 4 show the construction of a dished wheel wherein laminæ 16, 17 . . . 21 each consists of a series of sectors such as $16^a$, $16^b$ so arranged that the directions of their grains have a definite relation, for example substantially parallel with their respective chords. The laminæ 16, 17 are superimposed one upon another so that the joints, such as 22, between adjacent sectors e. g. $16^a$, $16^b$ are in staggered relationship with the joints, such as 23, between adjacent sectors e. g. $17^a$, $17^b$ of the adjacent lamina e. g. 17. The whole of the laminæ 16 . . . 21 are glued or otherwise cemented together and are preferably subjected to pressure between suitable dies to form a wheel of the desired shape.

Figure 6:
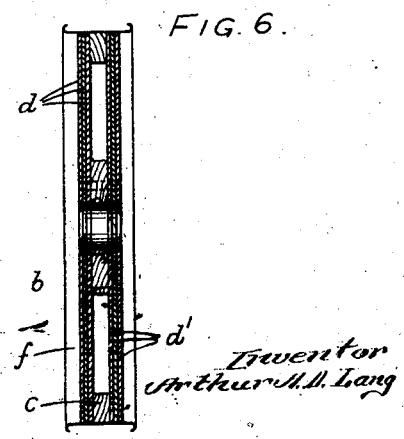

Figs. 5 and 6 illustrate a form of cellular or hollow wheel in which the disc shaped laminæ $d$ forming one side of the wheel are spaced from the laminæ $d'$ forming the other side by spacing rings of wood such as the hub ring $b$ and the peripheral ring $c$. These rings, which are cemented to the adjacent alminæ $d$, $d'$ may also be built up of cemented laminæ. The disc laminæ $d$, $d'$ may be of any suitable number and one or more of them be built up of sectors or of strips of wood in the manner hereinbefore described, the number of laminæ and the width of the spacing rings being dependent upon the load to be carried by the wheel and the width of its rim $f$ when provided with one.

Spacing rings such as $b$ may be interposed between the individual laminæ of pairs other than the central pair of laminæ so as to form a cellular wheel.

After the cement has set the wheel may be turned-up or otherwise treated, and if desired be fitted with a rim or hub.

Wheels constructed in accordance with the present invention are simple to manufacture, combine light weight with great strength and resilience, obviate the "drumming" which occurs with steel disc wheels, and are adapted readily to be balanced after the manner of aeroplane propellers.

Moreover, a wheel of this kind may readily be reduced in diameter or thickness by simple turning, should it be desired to employ tires of a smaller internal diameter.

Having thus described the nature of the said invention and the best means I know of carrying the same into practical effect, I claim:—

1. A vehicle wheel comprising a wooden body constituted by a plurality of laminæ or discs one of which is built up of segments placed edge to edge.

2. A vehicle wheel comprising a wooden body constituted by a plurality of laminæ or discs a plurality of which are built up of segments placed edge to edge.

3. A vehicle wheel comprising a wooden body constituted by a plurality of laminæ or discs each built up of segments placed edge to edge.

4. A vehicle wheel comprising a wooden body constituted by a plurality of laminæ or discs each built up of segments placed edge to edge and having their grains in definite relation with each other.

5. A vehicle wheel comprising a wooden body constituted by a plurality of laminæ or discs each built up of segments placed edge to edge with the directions of the grain in successive laminæ angularly displaced to an equal extent.

6. A vehicle wheel comprising a wooden body constituted by a plurality of laminæ or discs each built up of segments placed edge to edge, the joints of the segments in in one lamina being staggered with respect to the joints of the segments in any contiguous lamina.

7. A vehicle wheel comprising a wooden body constituted by a plurality of laminæ or discs each built up of segments placed edge to edge, the joints of the segments in one lamina being staggered with respect to the joints of the segments in any contiguous lamina and the directions of the grain of the wood being different in the several laminæ.

8. A vehicle wheel comprising a wooden body constituted by a plurality of laminæ or discs each built up of segments placed edge to edge, a plurality of laminæ at one side of the wheel being spaced from a plurality of laminæ at the other side of the wheel.

In testimony whereof I have signed my name to this specification.

ARTHUR ALEXANDER DASHWOOD LANG.